W. H. HERON.
MEANS FOR SECURING IN PLACE AND RENDERING USEFUL DEFLATED PNEUMATIC TIRES.
APPLICATION FILED MAR. 5, 1913.
1,232,306.
Patented July 3, 1917.
2 SHEETS—SHEET 1.
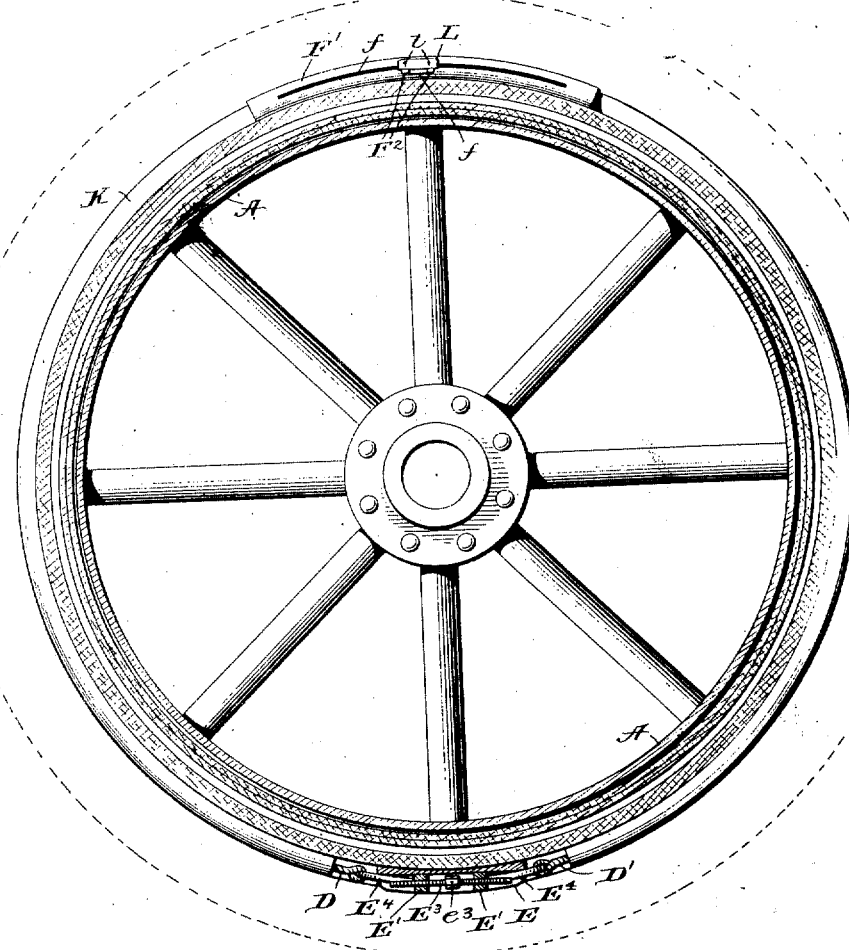
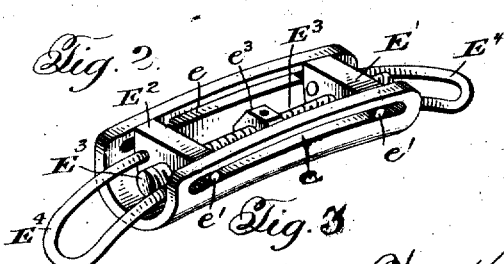
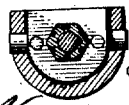

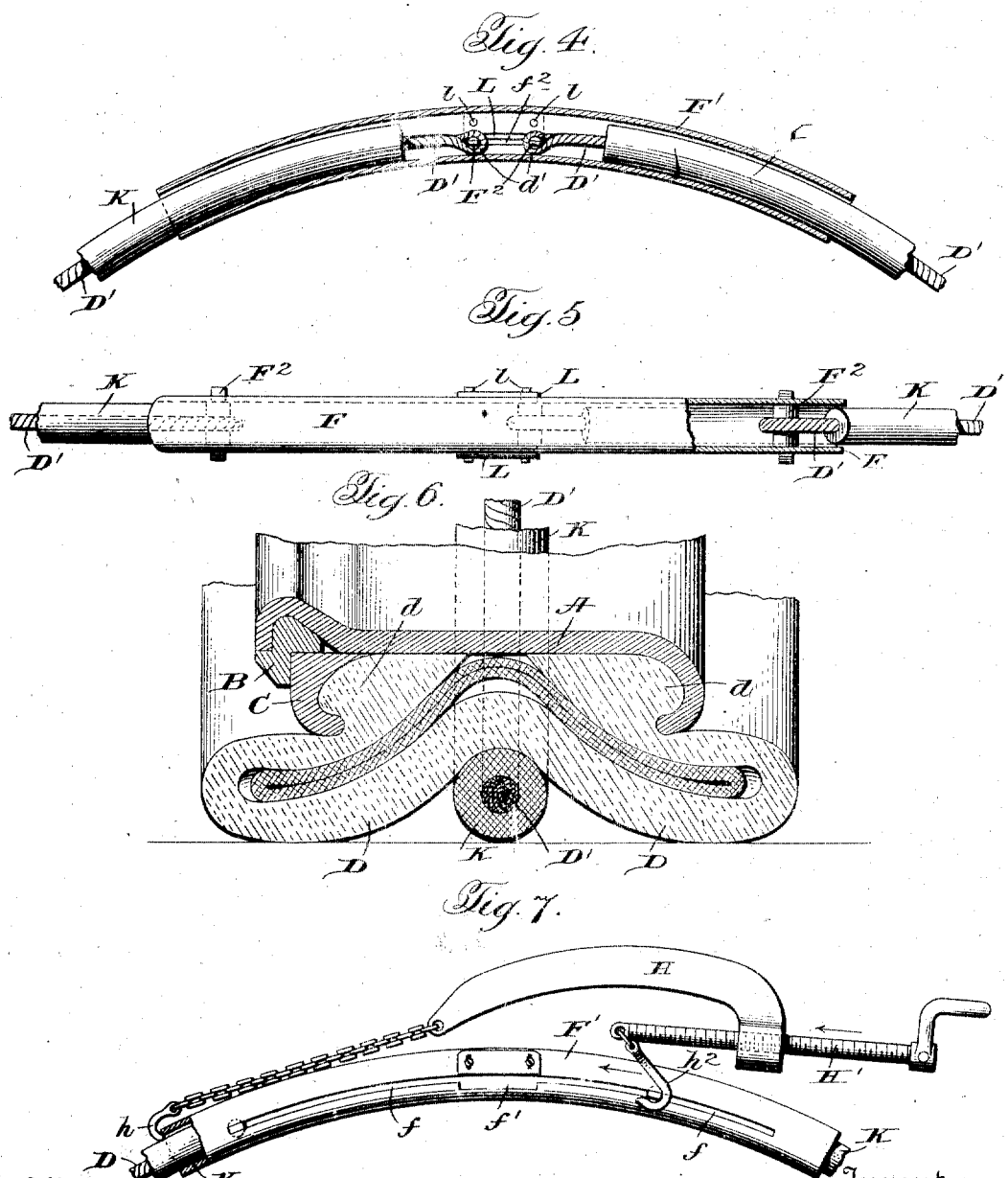

UNITED STATES PATENT OFFICE.

WILLIAM H. HERON, OF WASHINGTON, DISTRICT OF COLUMBIA.

MEANS FOR SECURING IN PLACE AND RENDERING USEFUL DEFLATED PNEUMATIC TIRES.

1,232,306.  Specification of Letters Patent.  Patented July 3, 1917.

Application filed March 5, 1913. Serial No. 752,183.

*To all whom it may concern:*

Be it known that I, WILLIAM HOLLAND HERON, a citizen of the United States, residing at Washington, in the District of Columbia, have invented certain new and useful Improvements in Means for Securing in Place and Rendering Useful Deflated Pneumatic Tires, of which the following is a specification, reference being had therein to the accompanying drawing.

This invention relates to means for securing in place and rendering useful deflated pneumatic tires.

In the employment of what is now commonly known as the quick-detachable and clencher tires used largely on motor cars, when the tire becomes deflated or collapsed, it is necessary to remove the same from the wheel rim, inasmuch as the maintenance of the tire on the wheel rim is dependent upon the inflation of the inner tube. The air pressure maintains the lock, which latter becomes ineffective as such when the tire is deflated. It is often the experience of motorists that in the absence of perfect inner tubes when the inner tube of the tire becomes punctured, it is necessary to either abandon the car temporarily or proceed on the bare rim. In the latter instance, the rim is invariably battered or destroyed.

The present invention is designed to render a collapsed tire serviceable and in that particular consists broadly in compressing intermediate portions of the shoe or tire toward the rim, so that the securing means will be rendered effective for maintaining the tire properly on the rim. A further purpose of the invention is that of rendering useful a deflated tire or "shoe" as a resilient member or tire for the wheel.

While the invention can be embodied in many different forms and a multitude of different mechanical means employed, there is shown in the accompanying drawing, an embodiment of a structure designed to serve well the purpose for which the invention is intended. The invention is not limited, however, to the particular construction shown and described.

In the drawing,

Figure 1 is an elevation of a wheel carrying the pneumatic tire showing parts of the tire broken away and the appliance or device applied to the tire, the latter being deflated.

Fig. 2 is a perspective view of one of the tightening devices.

Fig. 3 is a cross section through approximately the center thereof,

Figs. 4 and 5 are detail views of a supplemental tightening device,

Fig. 6 is a cross section taken through that portion of the rim and the tire where the tire is forced in to an extent that it pinches or engages the deflated inner tube.

Fig. 7 is a side elevation of a drawing-up and tightening means.

In the drawing, A represents the rim of a conventional "quick detachable" tire structure. This rim is, as usual, equipped with an annular split lock or key ring B and the clencher or securing ring C fashioned to engage the hooked edge of the tire or shoe, the opposite edge of the rim A being conveniently and usually shaped into hook formation. Of course, it is to be understood that any form of rim may be employed, but the one shown is that of a conventional type. D represents the shoe or tire having the hooked edges $d$.

D' represents a band conveniently in the form of a wire cable divided by preference into two sections. These sections have their ends looped as at $d'$ and are connected respectively with tightening devices E and F. The tightening device E comprises conveniently a rigid frame member of substantially U-shaped cross section. This member is formed with two oppositely arranged elongated slots $e$. E', $E^2$ designate head blocks fashioned to fit the inner face of the frame E and having at opposite edges projecting studs or pins $e'$ fitting in the elongated slots $e$. Intermediate of the head blocks is a tightening screw member $E^3$ having its opposite ends threaded in a reverse order respectively, the end portions fitting threaded openings in the head blocks. Centrally of the screw is a wrench hold $e^3$ rigid with the screw so that the screw may be turned in either direction and simultaneously move the head blocks toward and from each other. Each head block is provided with a loop $E^4$ with which the looped end of the cable members are connected, as shown in Fig. 1.

The opposite ends of the cable sections are connected to a tightening device comprising conveniently an elongated tubular member F' having slots $f$ in its opposite sides, the central portion being depressed to form pockets $f'$, $f^2$. The ends of the cables are looped over transverse bars $F^2$, the ends of which project through the slots in the tube. These bars are designed to be drawn toward each other and seated in the pockets or depressions in the tube at the center thereof, thus drawing up and tightening the cables. A convenient device for drawing the bars toward the center of the tightening device or tube is illustrated in Fig. 8, the same comprising conveniently a frame or body member H having at one end a hook $h$ fashioned to engage the end of the part F. The hook is conveniently connected with the frame by a chain or other flexible means. The opposite ends of the frame H have a threaded bore through which passes the screw H'. This screw H' has a crank at one end, while its opposite end has connected thereto by a suitable chain or other means, hooks $h^2$ designed to engage the opposite ends of the bar F'. After the two cross bars F' have been positioned in the pockets or recesses at the center of the tube F, it may be found advisable or convenient to apply a means for securing them against accidental displacement. For this purpose, a plate L may be employed, the same being arranged to project over the securing bars and adjustably held in position by a bolt and nut $l$ passing through the upper portion of the tube $F^2$.

In the more general application of the invention, it is desirable to place on the cables rubber tubing of a diameter to materially add to the diameter of the device, as illustrated at K in the drawing, for purposes presently to be described.

In the use of the device, after the tire has been deflated, the compressing ring or cables are placed over the same centrally, constituting in that particular an encompassing ring or band. The drawing up, stretching and fastening device F is then employed to draw the ends of the cable toward each other, the operation being substantially that of applying the hook $h$ to the bars $F^2$ through the loops at one end, while attaching the opposite hook $h^2$ to the end of the tube F. The bars through the loops are thus drawn into the pocket at the center of the tube. The device H is then reversed and the bar through the loop at the opposite end is likewise drawn toward the center, thus taking up the slack and tightening the band. It has been ascertained that approximately from twelve to fifteen inches of movement is required to completely compress the tread of the tire and by the device illustrated and designed as the tightener F, the major portion of this slack can be taken up readily. Thereafter for complete tightening, the turn buckle type, as designated by the reference E shown in Figs. 2 and 3 may be operated so as to with exactness secure the proper tension on the cables. By drawing the tread part of the shoe inward with the means described, the inner surfaces of portions thereof are pressed against the sides laterally forcibly maintaining in that particular the tire edges fixed against the locking projections on the wheel rim proper. In practice the tire when embraced and compressed by the contracting ring will have lateral deflections and curves as well as the shape material of this nature takes under compression. The rubber shoe or tire is thus held firmly on the rim much the same as they are held in position by the compressed air of the inner tube when the tire is inflated. When the tire has been drawn down in the manner above described, the side portions will constitute cushion tires supporting in that particular largely the weight of the vehicle or its portion of the weight of the vehicle, preserving the rim of the wheel. The size of the cable or band with its rubber coating may be such and conveniently is, as to constitute in effect a supplemental tread at the center of the shoe. The device when properly applied will serve also to prevent skidding.

While the tightening devices have been found to be effective, it is to be understood that either one or the other may be omitted. Obviously, any other form or type of device which will tend to draw the ends of the band up may be employed. The device may be easily collapsed and packed in the tool chest of the machine with but little trouble. Chains or ropes may be employed in lieu of a cable, the underlying principle of the invention being that of a device which can be employed for drawing down the center of the tread of the deflated tire so as to maintain the tire in place on the rim and render the same useful for cushioning purposes and as a usable tire.

In the specification where the term "tire" is employed it is to be understood that it applies to that portion of the tire as a whole which is generally termed the shoe, it being understood the invention comprehends the arrangement and the application either with or without the inner tube.

Having thus described the invention, what is claimed as new and desired to be secured by Letters Patent is:

1. The combination of a rim provided with tire retaining means at opposite sides thereof, and a deflated tire on the rim, of a detachable flexible band extending circumferentially and centrally of the tire, the diameter of the band being less than the width of the tire, and means for tightening the band to press the tread of the deflated tire inwardly toward the rim and maintain the tire in engagement with the first mentioned tire retaining means.

2. The combination with a rim provided with tire retaining portions at opposite sides thereof and a deflated tire on the rim, of an emergency device to hold the tread of the deflated tire pressed inwardly toward the base of the deflated tire, said device comprising a band adapted to extend circumferentially of the tire and embrace the tread portion thereof, said band having a flexible covering and separate ends, and means for drawing the ends of the band together to tighten the band on the tire, substantially as described.

3. The combination with a rim and a deflated tire having a tread portion, of non-elastic detachable means for maintaining the tread portion in a circumferentially inwardly disposed position, substantially as described.

In testimony whereof I affix my signature in presence of two witnesses.

WILLIAM H. HERON.

Witnesses:
L. S. BACON,
CALVIN T. MILANS.